(12) United States Patent
Mandelstam et al.

(10) Patent No.: US 8,351,583 B2
(45) Date of Patent: Jan. 8, 2013

(54) TELECOMMUNICATION SYSTEM AND METHOD OF SYNCHRONIZATION

(76) Inventors: David Mandelstam, Thornhill (CA); Michael Feldman, Thornhill (CA)

( * ) Notice: Subject to any disclaimer, the term of this patent is extended or adjusted under 35 U.S.C. 154(b) by 1090 days.

(21) Appl. No.: 12/154,006

(22) Filed: May 20, 2008

(65) Prior Publication Data

US 2009/0290197 A1 Nov. 26, 2009

(51) Int. Cl.
*H04M 11/00* (2006.01)
*H04M 9/00* (2006.01)
*H04M 1/00* (2006.01)
(52) U.S. Cl. ............. 379/100.17; 379/93.05; 379/93.08; 379/399.01; 379/413.04

(58) Field of Classification Search ............... 379/93.01, 379/93.05, 93.08, 100.01, 100.02, 100.13, 379/100.17, 387.01, 399.01, 413.02, 413.04, 379/902, 905; 370/324
See application file for complete search history.

(56) References Cited

U.S. PATENT DOCUMENTS

| | | | | |
|---|---|---|---|---|
| 6,009,082 A | * | 12/1999 | Caswell et al. | 370/276 |
| 6,611,537 B1 | * | 8/2003 | Edens et al. | 370/503 |
| 2002/0035623 A1 | * | 3/2002 | Lawande et al. | 709/221 |
| 2004/0172658 A1 | * | 9/2004 | Rakib et al. | 725/120 |

* cited by examiner

*Primary Examiner* — Binth Tieu

(57) ABSTRACT

The telecommunication system for communication between PSTN and analog FAXes and/or analog phones by using separated passes for data and synchronization clock flow.

18 Claims, 6 Drawing Sheets

TELECOMMUNICATION SYSTEM AND METHOD OF SYNCHRONIZATION

CROSS-REFERENCE TO RELATED APPLICATIONS

This is the first application filed for the present invention.

TECHNICAL FIELD

The present invention relates to method of synchronization that may be used in telecommunication apparatus including telecommunication lines for connecting analog telephone lines (connected to analog telephones and/or to analog FAX machines and/or modems) to the PSTN, high-speed interfaces and data processing units.

BACKGROUND OF THE INVENTION

Sending Faxes over digital connections to the PSTN (Public Switched Telephone Network) or over digital buses is not straight forward. Where an analog Fax machine connects to the PSTN via an analog interface that is connected to a digital telecommunication line (like ISDN, T1, E1, DS3, E3, fiber etc.) the fax reception/transmission is not reliable, because in general the digitization of the FAX signal is driven by a different clock frequency from the synchronized clock frequency of the digital network. Because the sampling frequency of the FAX stream by an analog interface is slightly higher or lower than the clock frequency of the digital line, data loss occurs resulting in imperfect faxes. If the PSTN connection is also analog, unless both the port supporting the FAX machine and the analog PSTN connection are completely synchronized, the same issue of imperfect faxes arises. This is a well known problem.

Failure to synchronize incoming and outgoing signals affects the quality of connection (voice in regular voice transmission). In the case of Fax transmission the quality of the connection becomes a problem. FAXes will exhibit regular errors, and in extreme cases will fail entirely.

The same problem can be manifested when the system that is connecting to one or more Fax machines uses a High-Speed serial interface (like Ethernet, PCI express, RapidI/O etc.)

One possible solution is to send each Fax as a complete packet (not real time) and buffer it before transmission to the Fax machine. But this solution is not free from limitations. It doesn't allow operating in real time and can not support long faxes. There is a possibility to use special methods of transmission like T38, but this implies an IP network and requires significant encoding/decoding equipment.

Lack of synchronization will affect voice quality. However, voice distortion can be compensated by data interpolation in case of overruns and signal repetition in case of under runs errors.

The modern telephone system includes the concept of a PBX (Private Branch eXchange) for connection among the internal telephones of a private organization and PSTN.

The PBX can have various numbers of analog interfaces to the local analog phones and local fax machines.

The configuration of the PBX has to be flexible (for supporting different numbers and types of telephones/faxes in the organization), and consequently the many popular PBXs are based on regular personal computers (PCs) and use specific add-in telephony interface boards both analog and digital) to connect to the analog telephone lines of the local phones and Faxes.

The modern standard PC allows the creation of PBX designs with almost unlimited flexibility, but the resources of a single PC can be easily exhausted by handling such CPU intensive processes as ECHO cancellation, voice compression, implementing conference calling, voice messaging, call recording etc. In this case the PBX function can be implemented based on more than one PC. Said PCs can be connected via High-Speed interface (like Ethernet, PCI express, RapidI/O etc.).

The well known synchronous telecommunication interface "H.100" was designed to allow connections between different telecommunication equipment and supports data transfer in particular between analog interface add-in cards that will support the connection of Fax machines, and digital telecommunication add-in cards. By using the H.100 interface all add-in telephony interface boards can be synchronized. The data is transmitted via synchronous parallel bus (H.100 interface bus) in a daisy chain. However, H.100 is intended only for telecommunication data transmission, and it cannot be used as main computer bus. So the H.100 bus is an additional interface bus to the main computer high speed interface bus (like PCI, PCI-X, PCI Express etc.).

By using this H.100 bus between telephony cards the voice or Fax traffic will move between analog an digital add-in boards synchronously, and the entire system will be driven by a single clock source typically derived from the PSTN master clock. This prevents buffer overrun or underrun conditions, and in this case there will be no problems with voice quality and fax reception.

However, this solution has two drawbacks. One is that while all synchronous data traffic is moving via H.100 bus from one interface to another, the system can not use the resources of the main PC processor for voice processing. The alternative is to create data processing units on the telephony interface cards themselves or install special data processing boards with connection to the H.100 bus. Of course this solution immediately increases the system cost and reduces flexibility of the PBX, by wasting the resources of the PC.

The second problem is that H.100 bus has a limited maximum physical length of the bus (the maximum length is 20 inches) and a limited number of boards that can be connected to it (the maximum is 20 boards). Because of those limitations the solution using the H.100 bus is not practical for PBXs based on multiple computers.

U.S. Pat. No. 7,283,270 of Boire-Lavigne S., et al presents a FAX transmission system joining the PSTN and IP Network using T.30, T.38, H.323 etc. interfaces. T.38 interface includes data compression (and decompression) so as to have an opportunity of repeating transmitted messages to correct possible errors. Such procedures seriously load communication lines and the apparatus, reducing system performance.

U.S. Pat. No. 6,721,282 of Mothey C. F. relates to telecommunication apparatus that is adapted to extend voice channel capacity and also uses compressing/decompressing procedures. For this purpose proposed apparatus includes special DSP modules for data processing.

In U.S. Pat. No. 6,552,826 Adler B. M., et al. the facsimile transmission system uses a buffer node including buffer storage for temporary storing at least a portion of received fax transmission and decompression device and an intermediate node including compression device.

In Pat. Appl. 20060109503 the author Seung-wook H. proposed a method (and system) for transmitting fax data to an external device (fax machine), that requires determining that an error has occurred in the fax transmission data and re-transmitting the fax data to the external device in response to the request signal.

Thus, general PBX based on the more then one computer, require for the reception/transfer voice and Fax data significant additional equipment (H.100 interface and supported data processing circuits), or special dedicated equipment for data compression/decompression. This invention is intended to eliminate these drawbacks of existing PBX systems by allowing for synchronization of analog and digital PSTN connections, and hence error free faxing and modem connections.

SUMMARY OF THE INVENTION

The first aspect of the present invention consists in that the received data of phone/FAX is partitioned into two groups: the information part and the synchronization signal, and each of said data groups is transmitted in two different ways.

The second aspect consists in that said information part is transmitted through apparatus and interfaces the bandwidth of which is significantly more than the frequency of the synchronization signal.

The third aspect consists in that serial interface is used to transmit said synchronization signal.

The fourth aspect consists in that for transmitting said synchronization signal a simple cable is used (wired, coaxial, fiber-optic) having practically unlimited length and loads.

The fifth aspect consists in that for transmitting said information part of received data is used standard computer high-speed interfaces, for example, Ethernet, PCI, PCI-X, PCI express, RapidI/O etc.

The sixth aspect consists in that the present invention allows the creation of a system by using remote apparatus limited only by the possibilities of said high-speed serial interfaces (Ethernet, PCI express, RapidI/O etc).

The seventh aspect consists in that the present invention allows the use of all the performance of the main computer processor for the purpose of telecommunication data processing like support conferencing, routing messages, echo cancellation, noise reduction without special data processing equipment.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

Figure 1A:
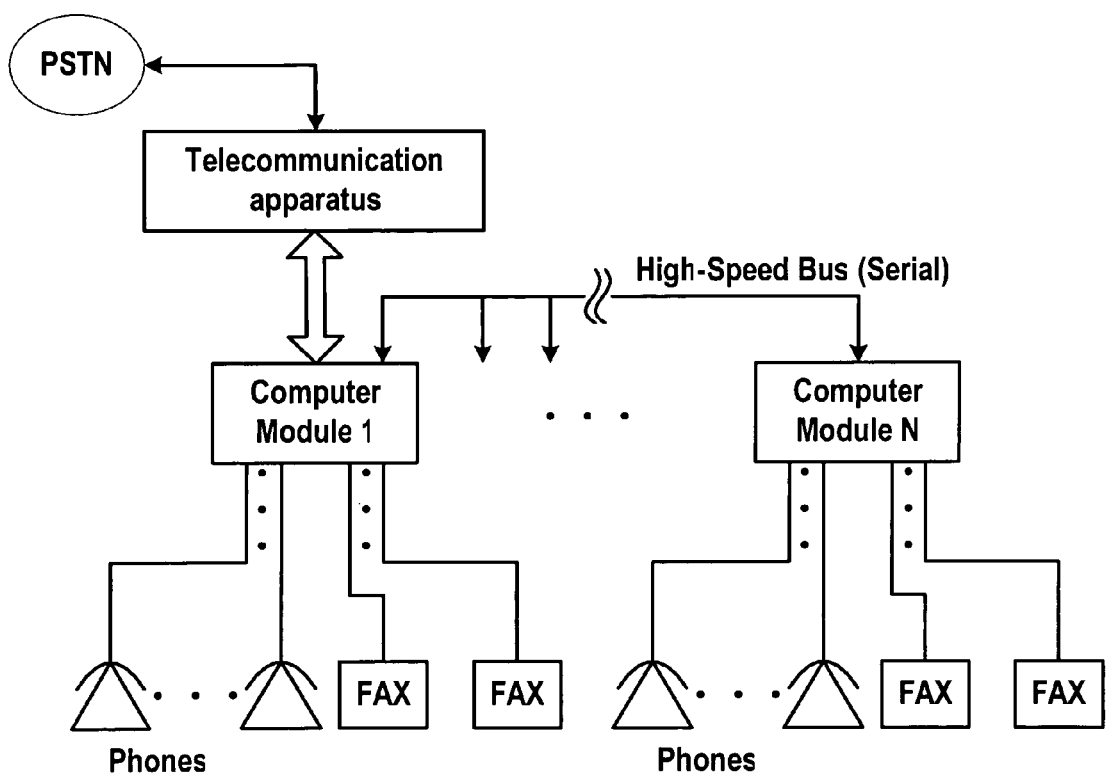
FIG. 1A is schematic illustration showing a prior art PBX (private branch exchange) supporting FAX machine connections.

FIG. 1A is schematic illustration showing a prior art PBX (private branch exchange). The computer module 1 is connected to PSTN (public switched telephone network) via one or more telecommunication interfaces. Here and further said telecommunication interfaces are T1, E1, DS3, E3, ISDN like interfaces, or analog interfaces that are not running on the same clock source as the interfaces supporting the FAX connections. The main function is to support the operation of analog FAXes and analog phones.

To increase the number of served phones and faxes, it is often necessary to connect additional phones and faxes via separate computer modules. The additional computer modules are connected to the PSTN via the first computer. Said computer modules are connected by a high-speed interface between each other.

Figure 1B:
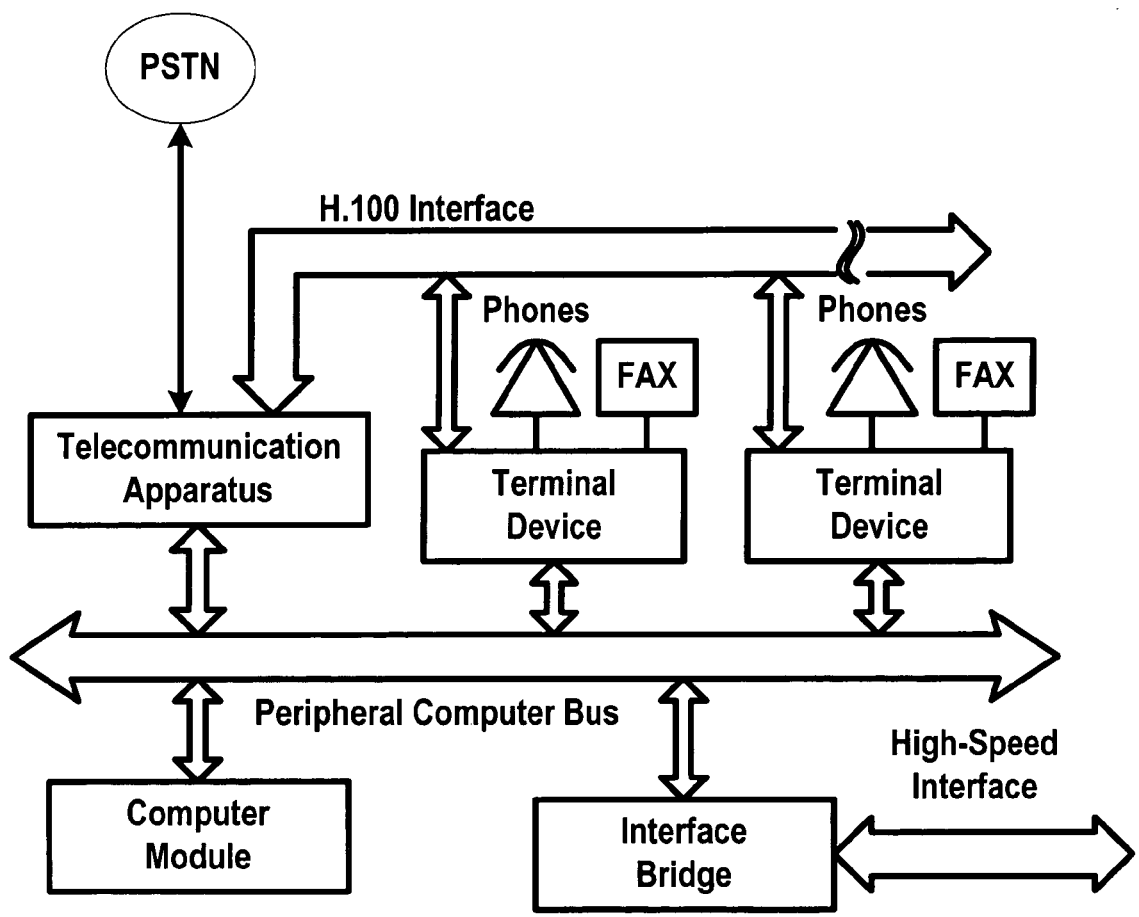
FIG. 1B is schematic illustration showing more detail a prior art PBX using H.100.

FIG. 1B shows the embodiment of computer module as a part of the PBX. A data processor unit is connected to a peripheral computer bus, for example, PCI-like bus. Said PSTN is connected to the peripheral computer bus via a telecommunication apparatus. This telecommunication apparatus can be a part of the computer module. All peripheral devices (phones, FAXes) are connected to said peripheral computer bus via corresponding terminal devices. Where the PBX includes more then one computer module, those modules are connected by a high-speed interface that is connected to the correspondent peripheral computer bus via an interface bridge.

The synchronous parallel H.100 bus connects the telecommunication apparatus and all terminal devices. The H.100 bus carries both voice data and the associated clock information between the telecommunication apparatus and all terminal devices.

Figure 2A:
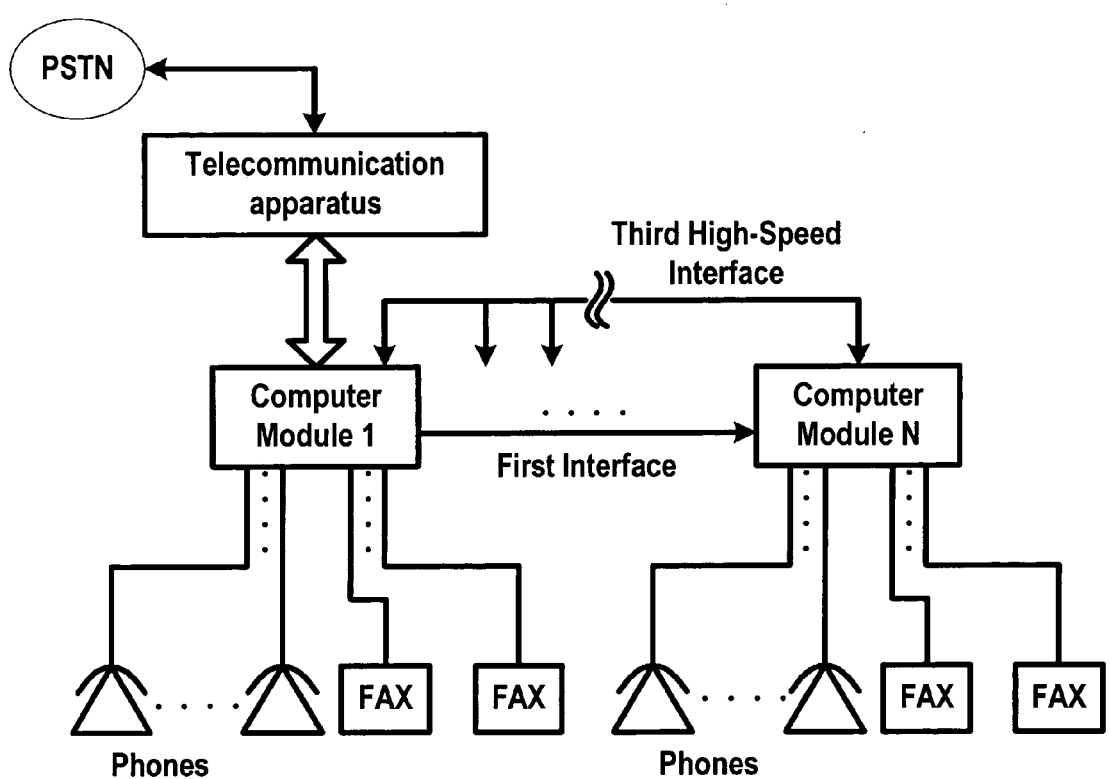
FIG. 2A is schematic illustration showing PBX according to present invention.

FIG. 2A is schematic illustration showing the PBX system based on the present invention. The computer module 1 is connected to the FSTN via one or more telecommunication interfaces. Here and further said telecommunication interfaces are T1, E1, DS3, E3, ISDN like interfaces or analog interfaces. The analog phones and FAXes are connected to one or more computer modules. These modules are connected via a third high-speed interface.

In the case that PBX includes more then one computer module then a first interface is used for purpose of synchronization. The first interface is the unidirectional interface and it transmits the recovery PSTN clock from telecommunication apparatus via computer module 1 as on FIG. 2A or directly. This interface can synchronize all terminal devices inside the computer modules with the PSTN clock, or in the case of an analog PSTN connection, with a master clock signal. This first interface is made in view of a twisted cable, a coaxial cable, a fiber-optic cable.

Figure 2B:
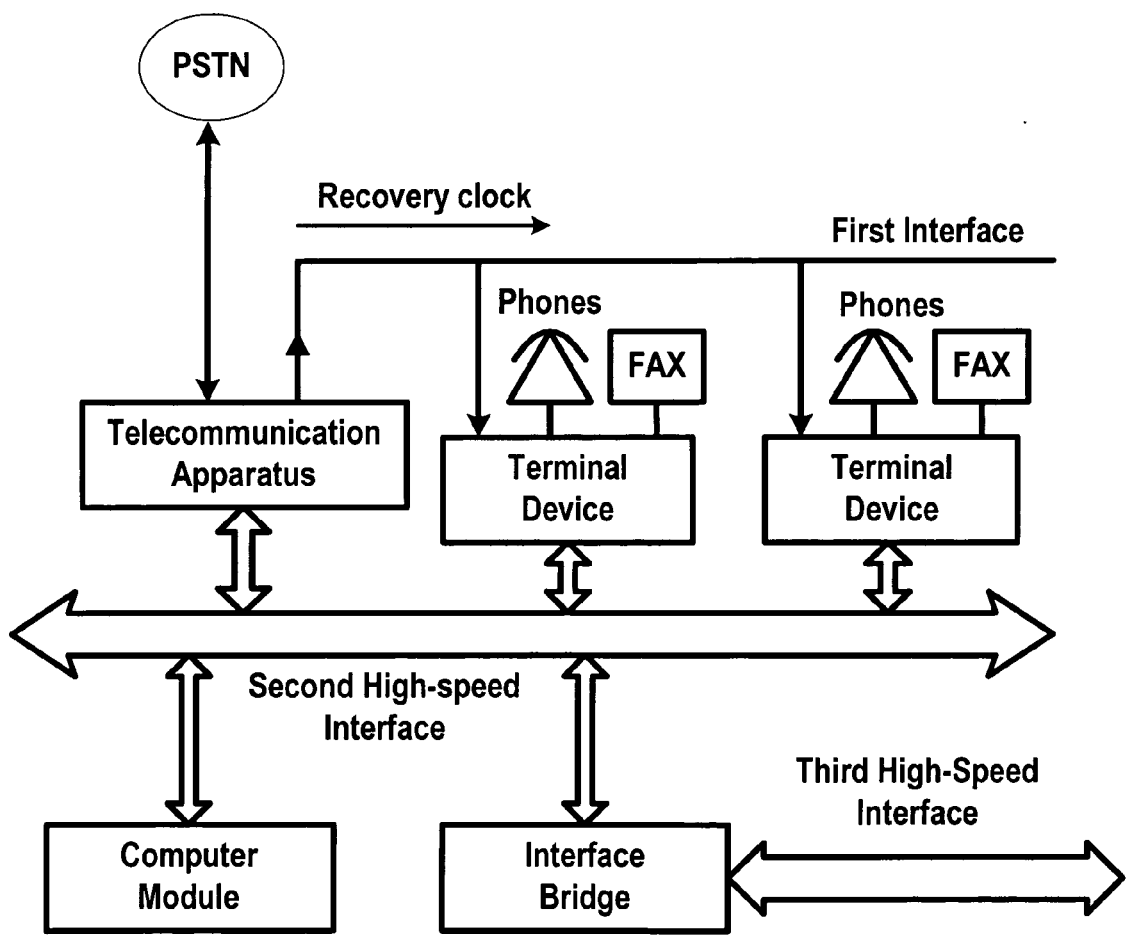
FIG. 2B is schematic illustration showing of an embodiment of PBX according to present invention.

FIG. 2B shows the embodiment of computer module as a part of the PBX according to present invention. A data processor unit is connected to a second high-speed interface, for example, PCI-like interface. Said PSTN is connected to the second high-speed interface via a telecommunication apparatus. All peripheral devices (analog phones, analog FAXes) are connected to said second high-speed interface via corresponding terminal devices. In the case that the PBX includes more then one computer module, those modules are connected by third high-speed interface that is connected to said second high-speed interface via an interface bridge.

For the synchronization data between the PSTN and analog phones and FAXes a first unidirectional interface is connected between the telecommunication apparatus and all target devices. This first interface transmits the recovery clock from the telecommunication apparatus to all target devices and makes their operation synchronous to the PSTN clock.

Figure 2C:
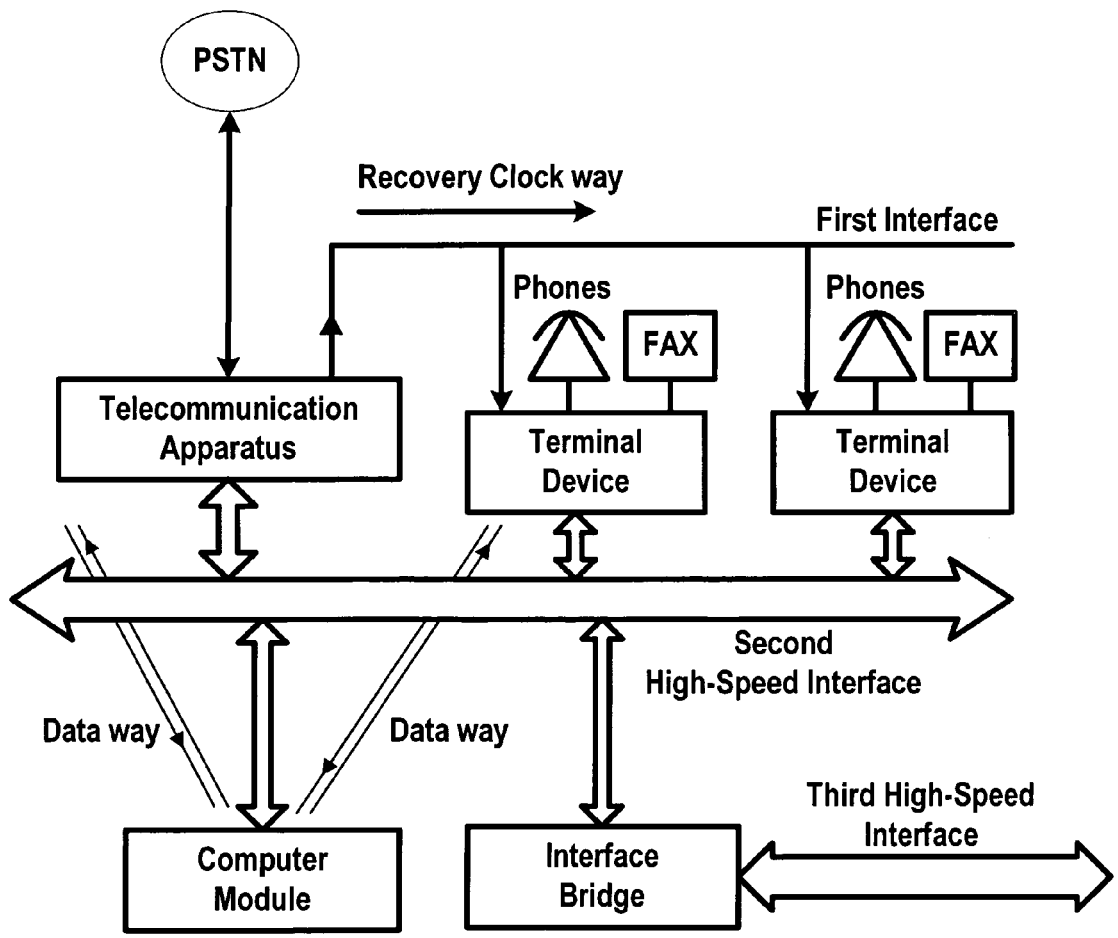
FIG. 2C shows information data flow diagram (data path and clock path) of an embodiment of PBX according to present invention.

FIG. 2C shows the same diagram as FIG. 2B with indication of data and synchronization flow between the telecommunication apparatus (PSTN) and terminal devices (analog phones and FAXes). The thick line shows a bidirectional data path. The thinner line shows a recovery clock unidirectional path.

Figure 3:
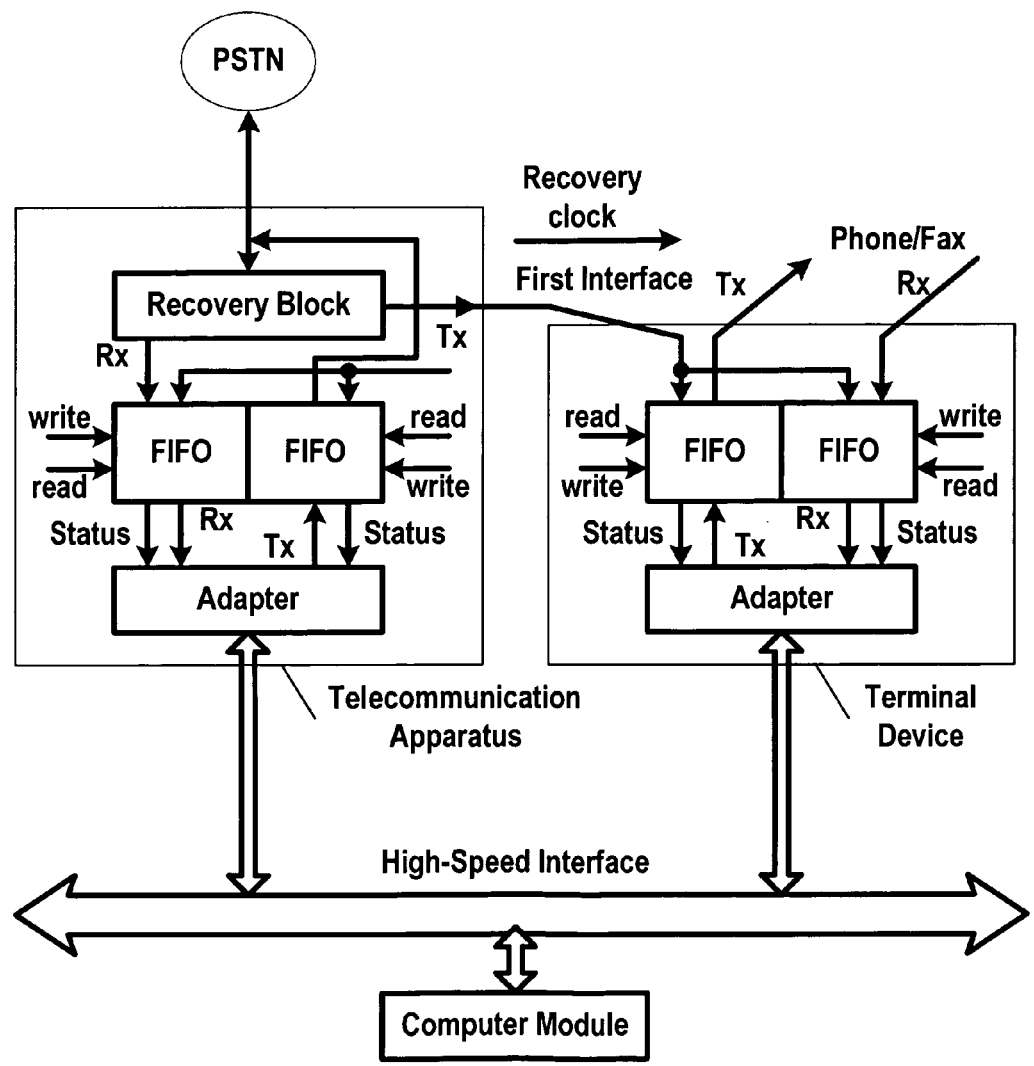
FIG. 3 shows more detail functional structure of an embodiment of PBX according to present invention.

FIG. 3 shows the data flow between the PSTN and analog Fax (analog phone) based on the present invention (the computer module isn't shown). The received data from the PSTN comes to the recovery block of the telecommunication apparatus. The recovery block separates this received data into two signal groups: an information group (information data) and recovery synchronization clock. The received information data goes via pair of FIFO memory blocks and the (interface) adapter to the high-speed interface bus. The same pair of FIFO memory blocks is placed in each of the terminal devices.

The writing to and reading from said FIFOs is carried out under the control of the recovery clock. Said FIFO memory blocks are controlled buffers and provide synchronization between PSTN and asynchronous high-speed interfaces, or between analog FAX/phone and high-speed interface. One part of said FIFO pair (left part on FIG. 3) in the telecommunication apparatus serves the transmission information data from PSTN to the peripheral devices, another part of said FIFO pair serves transmission information data from the peripheral devices to PSTN. The FIFOs in the peripheral devices work similarly.

The recovery clock is transmitted via the first interface to the target device and is used to exchange information data between analog FAX (analog phone) connected to this terminal device and this terminal device transmit/receive FIFO. The receive information data from terminal device FIFO goes via interface adapter to the high-speed bus and transmit information data goes from high-speed bus to terminal device FIFO based on the high-speed bus clock.

The information data moves between telecommunication apparatus and terminal device via the high-speed bus and if it is necessary, it moves via data processing unit and high-speed bus. This data flow allows using power of the computer module for the data processing.

We claim:

1. A telecommunication system, comprising:
   a telecommunication apparatus for connection to a PSTN for receiving and transmitting data and comprising a recovery block for separating receiving data from PSTN into two signal groups: an information group and a recovery synchronization clock, and said signals of each of said groups are connected correspondently to: bidirectional information bus and unidirectional synchronization output,
   a computer module,
   one or more terminal devices in the view of add-in cards and each of said devices is connected to one or more FAXes or/and analog phones;
   said system wherein:
   each of said terminal devices includes a synchronization input and said input is connected to synchronization clock output of recovery block via a first interface,
   said telecommunication apparatus includes an adapter that connects via second high-speed interface to said computer module and supports transmit/receive data between said computer module and said adapter,
   said adapter is connected to bidirectional information bus, each of said terminal devices connects via second high-speed interface to said computer module.

2. The system according to claim 1, wherein said first interface is a serial interface.

3. The system according to claim 2, wherein said synchronization output of recovery block is connected to said synchronization inputs via a cable that transmits said recovery synchronization clock.

4. The system according to claim 3, wherein said clock cable is chosen from following cables: twisted cable, flat cable, coaxial cable, fiber-optic cable.

5. The system according to claim 1, wherein said second high-speed interface is asynchronous interface in comparison to the first interface.

6. The system according to claim 5, wherein said second high-speed interface is chosen from following interfaces: PCI, PCI-X, PCI express, RapidI/O, Ethernet.

7. The system according to claim 2, wherein said first interface is characterized in that its maximum physical length is more than 1 meters and allows to connect all required said interface devices that are connected to said computer module.

8. The system according to claim 1, comprising at least two pair memory blocks that are organized as FIFO for receiving data of information group and transmitting data from said computer module to said PSTN, and wherein each of said terminal devices comprises said pair FIFO memory block for synchronization moving data between asynchronous second high-speed interface and recovery synchronization clock, and wherein further one of each FIFO memory block of said pair FIFO memory blocks is intent for receiving data and another one for transmitting data.

9. The system according to claim 8, wherein said telecommunication apparatus comprises said pair FIFO memory block for synchronization moving data between asynchronous second high-speed interface and recovery synchronization clock.

10. The system according to claim 1, comprising more than one computer module, those computer modules are connected via third high-speed interface bus subsystem and said third high-speed interface bus subsystem is connected to said second high-speed bus of each said computer modules.

11. The system according to claim 10, wherein third high-speed interface bus subsystem comprises a bidirectional high-speed interface bus that is chosen from following group: PCI express, RapidI/O, Ethernet.

12. The system according to claim 1, wherein said telecommunication apparatus connected to PSTN via one or more interfaces chosen from the group including T1, E1, DS3, E3, ISDN like interfaces.

13. The system according to claim 1, wherein said telecommunication apparatus transmit and receive data to/from PSTN based on said recovery synchronization clock.

14. The system according to claim 1, wherein said terminal devices transmit and receive data to/from said analog FAXes and/or said analog phones based on said recovery synchronization clock that is coming via first interface.

15. The system according to claim 1, wherein said data of information group moving between said PSTN and said analog FAXes and/or said analog phones via second high-speed interface inside the computer module for data processing.

16. The system according to claim 10, wherein data of information data moving between said PSTN and said analog FAXes and/or said analog phones via second high-speed interface inside the computer modules and via third high-speed interface bus subsystem for data processing.

17. A method of a communication system synchronization by receiving and transferring data of information group, the communication system comprising a telecommunication apparatus for receiving and transferring data of information group connected to PSTN and comprising a recovery block separating receiving data of information group and recovery synchronization clock, one or more computer modules, one or more terminal devices connected to one or more analog FAXes and/or analog phones;

said method comprising following steps during the process of receiving-data of information group from PSTN:

receiving of data information group from PSTN, separating said data to two signal groups—data of information group and recovery synchronization clock, transmitting said signal groups from said recovery block via separate paths, correspondently: said recovery synchronization clock to said terminal devices directly and said data of information group to said computer module via a high-speed interface, transmitting said data of information group further from said computer module to said terminal devices via said high-speed interface, creating outgoing data based on the said information group and transmitting said outgoing data via said terminal devices by using said recovery synchronization clock to said analog FAXes and/or analog phones;

said method comprising following steps during the process of transmitting data from said analog FAXes and/or analog phones to said PSTN:

receiving data from said analog FAXes and/or analog phones based on the said recovery synchronization clock, transmitting said data from said terminal device to said computer module via high-speed interface, data processing, transmitting said data from said computer module to said telecommunication apparatus via high-speed interface, creating transmitting data for PSTN based on the recovery synchronization clock and transmitting said data to PSTN.

18. The method according to claim 17, wherein said communication system comprises at least two groups of pair FIFO memory blocks, each of said interface device comprises one of this pair FIFO memory blocks and said telecommunication apparatus comprises also one of said pair FIFO memory blocks, and said method wherein following steps of the process of receiving data of information group from PSTN:

transmitting said signal groups from said recovery block via separate ways, correspondently: said recovery synchronization clock to said terminal devices directly and said data of information group to said computer module via a high-speed interface, creating outgoing data based on the said information group and transmitting said outgoing data via said terminal devices by using said recovery synchronization clock to said analog FAXes and/or analog phones; and following steps the process of transmitting data from said analog FAXes and/or analog phones to said PSTN:

transmitting said data from said terminal device to said computer module via high-speed interface, creating transmitting data for PSTN based on the recovery synchronization clock and transmitting said data to PSTN;

comprise intermediate step:

buffering data with the help of said FIFO memory blocks for synchronization of moving said data between said asynchronous high-speed interface bus and synchronization ways (PSTN and analog FAXes and/or analog phones).

\* \* \* \* \*